(12) United States Patent
Jallon

(10) Patent No.: US 8,014,810 B2
(45) Date of Patent: Sep. 6, 2011

(54) COGNITIVE RADIO TERMINAL

(75) Inventor: Pierre Jallon, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 742 days.

(21) Appl. No.: 12/156,357

(22) Filed: May 30, 2008

(65) Prior Publication Data

US 2008/0299918 A1 Dec. 4, 2008

(30) Foreign Application Priority Data

May 31, 2007 (FR) ...................................... 07 55396

(51) Int. Cl.
*H04B 7/00* (2006.01)
(52) U.S. Cl. ........ 455/522; 455/103; 455/509; 455/447; 455/69; 455/450; 370/319; 370/351
(58) Field of Classification Search .................. 455/509, 455/450, 451, 452.2, 522, 69, 425, 447, 446, 455/464, 13.4, 515, 552.1, 103; 370/351, 370/319, 342; 375/136
See application file for complete search history.

(56) References Cited

U.S. PATENT DOCUMENTS

| | | | | |
|---|---|---|---|---|
| 2002/0002052 | A1* | 1/2002 | McHenry ....................... | 455/447 |
| 2006/0067354 | A1 | 3/2006 | Waltho et al. | |
| 2006/0083205 | A1 | 4/2006 | Buddhikot et al. | |
| 2006/0084444 | A1* | 4/2006 | Kossi et al. ................... | 455/450 |
| 2007/0259681 | A1* | 11/2007 | Cheng et al. .................. | 455/522 |
| 2008/0165754 | A1* | 7/2008 | Hu ................................. | 370/342 |
| 2009/0046625 | A1* | 2/2009 | Diener et al. ................. | 370/319 |
| 2011/0090939 | A1* | 4/2011 | Diener et al. ................. | 375/136 |

FOREIGN PATENT DOCUMENTS

EP 1750467 A1 2/2007

OTHER PUBLICATIONS

Cordeiro, C., et al, "IEEE 802.22: The First Worldwide Wireless Standard Based on Cognitive Radios", New Frontiers in Dynamic Spectrum Access Networks, pp. 328-337 (Nov. 8, 2005).
Mitola, J., "Cognitive radio: an integrated agent architecture for software defined radio", Royal Institute of Technology, Stockholm, PhD Dissertation (May 8, 2000).
European Search Report, EP 08 15 6908, dated Sep. 23, 2008.

* cited by examiner

*Primary Examiner* — Tan Trinh
(74) *Attorney, Agent, or Firm* — Nixon Peabody LLP

(57) ABSTRACT

A cognitive telecommunication terminal designed to coexist with a primary telecommunication system using a set (B) of transmission frequencies comprising a plurality of spatially distributed transmitters, each transmitter being suitable for transmitting within a coverage area in a plurality of frequency bands in said set allocated to the transmitter. The terminal comprises positioning means, a database storing information defining the coverage area for each transmitter, calculation means suitable for determining the maximum power that the terminal can transmit for each frequency band in said set, and for sorting frequency bands as a function of the maximum powers thus obtained. Finally, the terminal comprises radio transmission/reception means suitable for detecting the presence of a signal in the frequency bands thus sorted, beginning with the frequency band associated with the highest maximum power.

19 Claims, 4 Drawing Sheets

COGNITIVE RADIO TERMINAL

CROSS REFERENCE TO RELATED APPLICATIONS OR PRIORITY CLAIM

This application claims priority to French Patent Application No. 07 55936, filed May 31, 2007.

DESCRIPTION

Technical Field and Prior Art

This invention relates to the domain of cognitive radio, and particularly WRAN (Wireless Regional Area Networks) networks.

The increasing congestion of the spectrum has led to envisaging the use of telecommunication systems capable of coexisting with systems with previously allocated frequency bands, called primary systems. Major research is currently being carried out on two coexistence strategies. The first consists of using a very weak signal by means of very strong spectrum spreading, which is the method adopted by ultra-wide band (UWB) systems. The second consists of cognitively using a part of the spectrum occasionally or temporarily unoccupied, in other words the cognitive radio method. The only constraint applicable to a cognitive radio system, also called a secondary system, is that it should not hinder primary radio systems. A description of cognitive radio is given in the founding thesis by J. Mitola entitled "Cognitive radio: an integrated agent architecture for software defined radio", Royal Institute of Technology, Stockholm, PhD Dissertation, May 8, 2000.

In particular, the principle of cognitive radio was selected for the development of WRANs (Wireless Regional Area Network). These networks are currently being standardised within the work group IEEE 802.22. More precisely, this standard now being produced proposes the cognitive use of vacant UHF and VHF bands to make a point-to-point wireless transmission in a WRAN network. An introduction to standard IEEE 802.22 is given in the article by C. Cordeiro et al. entitled "IEEE 802.22: an introduction to the first wireless standard base on cognitive radios", published in Journal of Communications, Vol. 1, No. 1, April 2006, pp. 38-47.

In particular, standard 802.22 discloses how UHF bands allocated to the DVB-T (Digital Video Broadcast-Terrestrial) television broadcasting system can be used for this purpose. It is reminded that the DVB-T standard uses an OFDM (Orthogonal Frequency Division Multiplexing) modulation to transmit compressed video/audio streams. Consequently, a WRAN network transmitter must be able to easily determine which UHF band it should use and the power at which it can transmit. It is currently proposed that the cognitive radio terminal should systematically scan the different bands and measure the field intensity in them, using the received signal power and receiver parameters. The base station must stop transmitting periodically to enable the terminal to make a measurement in a band currently being used (in-band channel), and this correspondingly reduces the throughput both on the uplink and the downlink.

The purpose of this invention is to disclose a method to easily determine UHF channels available for cognitive transmission, without a major reduction in speed between the terminal and the base station.

DISCLOSURE OF THE INVENTION

This invention is defined by a cognitive telecommunication terminal designed to coexist with a primary telecommunication system using a set of transmission frequency bands, comprising a plurality of spatially distributed transmitters, each transmitter being suitable for transmitting within a coverage area in a plurality of frequency bands in said set allocated to the transmitter, said terminal comprising:

positioning means, suitable for providing the position of said terminal with a predetermined precision;

a database in which the position, allocated frequency bands and coverage information defining the coverage area are stored for each transmitter;

calculation means suitable for determining the maximum power that the terminal can transmit for each frequency band in said set, starting from said terminal position, and the position, allocated frequency bands and coverage area for each transmitter, said calculation means also being suitable for sorting frequency bands as a function of the maximum powers thus obtained;

radio transmission/reception means designed to detect the presence of a signal in the frequency bands thus sorted, beginning with the frequency band associated with the highest maximum power.

Advantageously, the calculation means are also suitable for taking each frequency band in said set, and determining transmitters with said band among their allocated frequency bands, and then, as a function of the database coverage information, determining the coverage areas of each of these transmitters, and deducing the transmitter for which the coverage area is closest to said terminal for the band considered.

The calculation means are typically suitable for using a propagation model and calculating the maximum power that the terminal can transmit without the field intensity generated at the point on the coverage area closest to the terminal exceeding a predetermined threshold value.

A power detector can easily detect the presence of a signal in said sorted bands.

According to a first embodiment, the positioning means are a GPS receiver.

According to a second embodiment, said positioning means determine the position of the terminal with a precision equal to the average diameter of a coverage area, as a function of the spectral signature of the closest transmitter to the terminal.

Since the primary telecommunication system transmits OFDM signals of predetermined time parameters in frequency bands of said set, the positioning means are advantageously suitable for determining the probability of the presence of an OFDM signal in each of said bands and sorting the bands in order of decreasing probability to obtain an ordered list of bands.

For example, the time parameters may be the useful duration and cyclic prefix length of an OFDM symbol. The probability of an OFDM signal being present is then estimated by the discrimination function:

$$J(\alpha, \beta) = \sum_{p=-P}^{P} \left| \frac{1}{U} \sum_{u=0}^{U-1} s(u) s*(u-\alpha) e^{-2i\pi \frac{p}{\alpha+\beta}} \right|^2$$

where s(u), u=0, . . . , U−1 is a sequence of samples of the signal received by the terminal, obtained after demodulation into baseband and sampling, $\alpha$ and $\beta$ are the useful duration and the prefix length of an OFDM symbol respectively, expressed as a number of samples.

According to one example embodiment, the primary telecommunication system is a DVB-T broadcasting system, six frequency bands are allocated per transmitter and P=3.

Advantageously, the terminal position is given by the transmitter for which all allocated bands are the first to appear in said ordered list.

Similarly, the invention relates to a method of searching for available bands for a cognitive terminal like that described above.

BRIEF DESCRIPTION OF THE DRAWINGS

Other characteristics and advantages of the invention will become clear after reading a preferred embodiment of the invention with reference to the attached figures among which.

DETAILED DISCLOSURE OF PARTICULAR EMBODIMENTS

We will once again consider a cognitive telecommunication system that is required to coexist with a primary telecommunication system capable of occupying a plurality of frequency bands, for example a WRAN system that is to coexist with a DVB-T television signal broadcasting system.

The basic idea of the invention is to determine frequency bands available in the primary system using the position of the terminal and a database giving the positions of the different transmitters in the primary system and the coverage of each.

Figure 1:
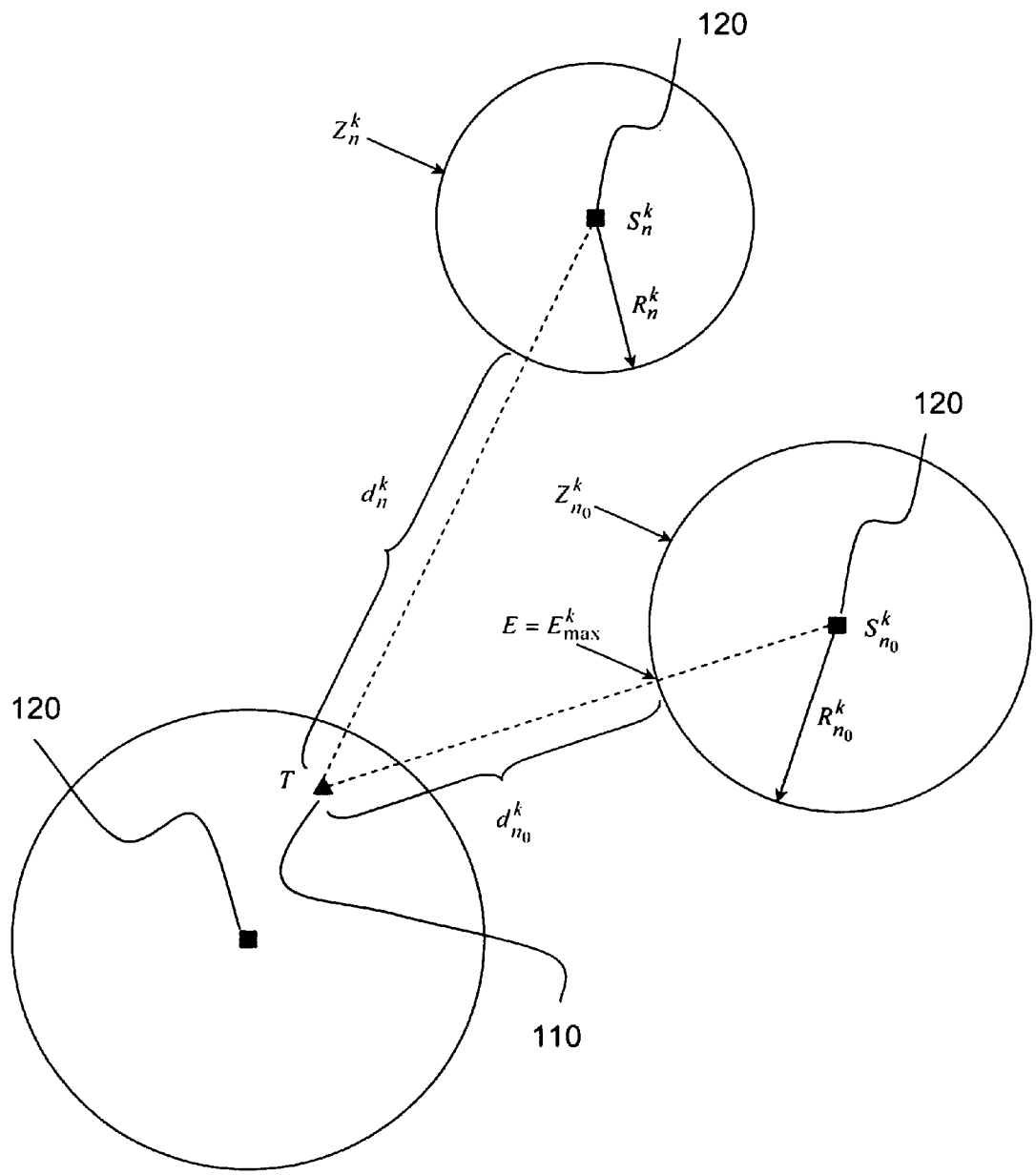
FIG. 1 diagrammatically shows the basic principle of the invention.

FIG. 1 shows the method used in this invention.

The terminal in the secondary telecommunication system T is shown as 110 and transmitters in the primary telecommunication system are shown as 120.

It is assumed that the terminal knows its own position, the positions of transmitters 120 and the corresponding coverage areas of each of them. The coverage areas are represented by grey disks in FIG. 1. A coverage area of a transmitter refers to the area in which the field intensity generated by this transmitter is greater than a given minimum value, typically 44 μV/m. A coverage area can be described by a set of geometric parameters: a coverage radius in the simple case of an isotropic transmission, or a coverage radius, a direction and a sector angular aperture in the case of a sectorial transmission, or even the corresponding coordinates of a set of points defining the contour of the coverage area.

Finally, it is assumed that the cognitive terminal knows the corresponding frequency bands allocated to the different transmitters 120. We will denote the list of these frequency bands as $B=\{B_k\}_{k=1,\ldots,K}$, where K is the total number of frequency bands used by the primary system.

For each frequency band $B_k \in B$, the terminal 110 searches for transmitters $S_1^k, S_2^k, \ldots, S_{N_k}^k$ to which the $B_k$ band is allocated. The terminal then calculates distances denoted $d_1^k, d_2^k, \ldots, d_{N_k}^k$ that separate it from the corresponding coverage areas $Z_n^k$ of these transmitters. For example, if the coverage of a transmitter $S_n^k$, $n \in \{1, \ldots, N_k\}$ is defined by its coverage radius $R_k^n$ for band $B_k$, the distance $d_n^k$ to the coverage area of this transmitter will be simply given by $D_n - R_k^n$, where $D_n$ is the distance separating the terminal and the transmitter $S_n^k$ considered. A more complex distance evaluation could be made in the case of a sectorial coverage area or a sampled area contour, for example by searching for the point in this contour closest to the transmitter.

If the terminal position is known with a margin of error, in other words within an uncertainty area, then the worst case will be considered for the purposes of the above calculation. More precisely, for the calculation of the distance $d_n^k$ to a given transmitter $S_n^k$, we will assume that the terminal is located at the point in the uncertainty area closest to the coverage area of $S_n^k$.

If the terminal is located inside a coverage area of a given transmitter, the frequency bands allocated to this transmitter are immediately excluded from the list of frequency bands B. If the terminal is inside several coverage areas of different transmitters, the set of frequency bands allocated to these transmitters is excluded from the list of frequency bands B. The list thus reduced will be denoted B'.

For each frequency band $B_k$ belonging to B', the terminal determines the transmitter for which the coverage area is closest, in other words the transmitter with the shortest distance $d_n^k$, namely $D_{n_0}^k$ where $$n_0 = \underset{n}{\mathrm{Argmin}}(d_n^k).$$

The terminal then uses a propagation model to determine the maximum power at which it can transmit without disturbing reception in the closest coverage area, in other words the coverage area of transmitter $S_{n_0}^k$. The terminal can advantageously use a propagation model to achieve this, for example a propagation model conforming with the recommendation in ITU P.1546, entitled "Method for point-to-area predictions for terrestrial services in the frequency range 30 MHz to 3000 MHz", r.2, August 2005.

More precisely, the terminal uses this model to calculate the power $P_{max}^k$ at which it can transmit without the maximum field intensity at point M on the contour of the coverage area of transmitter $S_{n_0}^k$ closest to the terminal, exceeding a threshold value $E_{max}^k$. For example, a value of 30 μV/m can be used for $E_{max}^k$.

If the position of the terminal is only known with an uncertainty, then we will once again consider the worst case, in other words we will use point M on the contour of the coverage closest to the uncertainty area.

The maximum power values $P_{max}^k$ are then sorted and the terminal verifies if the corresponding frequency bands are available, in decreasing order of power. For a given band $B_k$ of B', the terminal detects if a signal is already present in it, for example an analogue TV signal or a signal from another cognitive system. If this is the case, the terminal can transmit inside this band at a power less than $P_{max}^k$. Thus, the search for an available band is optimized because it gives the first available band enabling a transmission with the highest possible power without disturbance of the primary telecommunication system.

Figure 2:
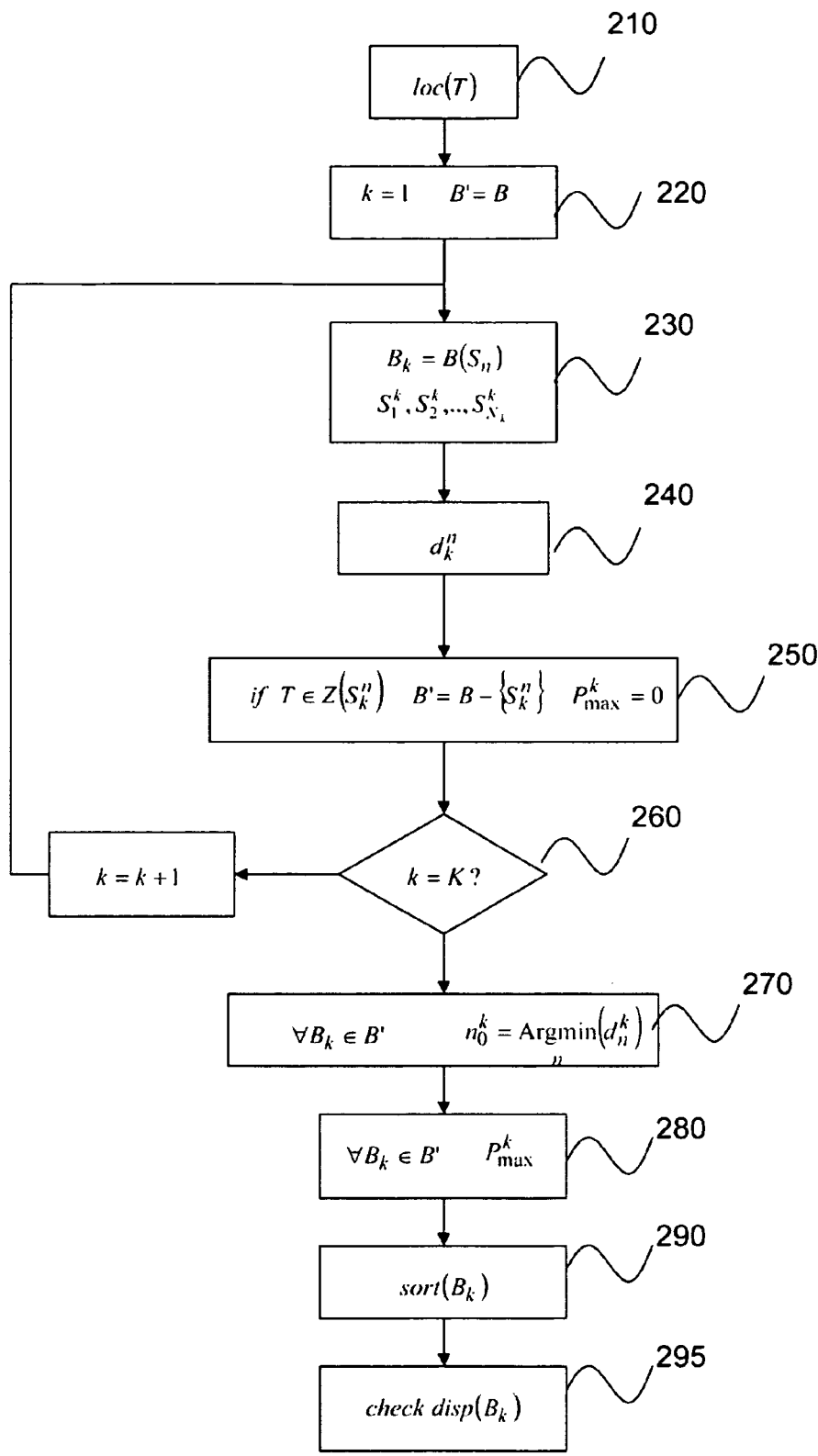
FIG. 2 gives the flowchart of the method for searching for an available band according to one embodiment of the invention.

FIG. 2 is a flowchart showing the method of determining an available band for a cognitive terminal according to the invention.

In step 210, the terminal T obtains or determines its position itself, and then an iterative search loop is started, one iteration being made for each band $B_k$ in the primary telecommunication system.

In 220, a band counter is initialised with k=1 and a set B' of available bands is initialized to the set B of bands in the primary telecommunication system.

In 230, a search is made for transmitters $S_1^k, S_2^k, \ldots, S_{N_k}^k$ in the primary system to which band $B_k$ is allocated, in other words transmitters $S_n$, n=1, ..., N such that $B_k \in B(S_n)$ in which N is the number of transmitters and B(.) is a function giving the allocated bands of a transmitter.

In 240, the distance $d_n^k$ separating the terminal from the coverage area of $S_n^k$ is calculated, for each transmitter $S_n^k$, n=1, ..., $N_k$.

In 250, we determine if the terminal T belongs to the coverage area of a transmitter $S_n^k$ and if so, the set B' is updated by eliminating bands allocated to $S_n^k$, namely $B'=B'\backslash B(S_n^k)$. The use of deleted bands is condemned by imposing $P_{max}^k=0$ for these bands.

In 260, we test if the total number K of bands has been reached. If not, the band counter is increased and we return to step 230. On the other hand, if all bands have been reviewed, then a step 270 is carried out for each band $B_k$ of B', to find the transmitter $S_{n0}^k$ for which the distance $d_n^k$ is shortest, in other words the transmitter that is likely to be most disturbed by a transmission from the terminal in band $B_k$.

In 280, the propagation model mentioned above is used to calculate the power $P_{max}^k$ with which the terminal can transmit without the field intensity at the proximal point M of the coverage area exceeding the predetermined threshold value $E_{max}^k$, for each band of B'.

Step 290 consists of a sort of frequency bands $B_k$ as a function of maximum power values $P_{max}^k$ that the terminal can transmit in these bands.

In 295, a search is made among the set B for available bands beginning with the band corresponding to the highest power $P_{max}^k$ and then continuing in decreasing order of power.

According to one variant, the process to search for transmitters by band can be accelerated by limiting the iteration loop to bands $B_k$ such that $B_k \in B'$. In other words, if a band is eliminated during an iteration because it is allocated to a transmitter for which the coverage area includes the terminal, it is no longer taken into account in the remainder of the search.

Figure 3:
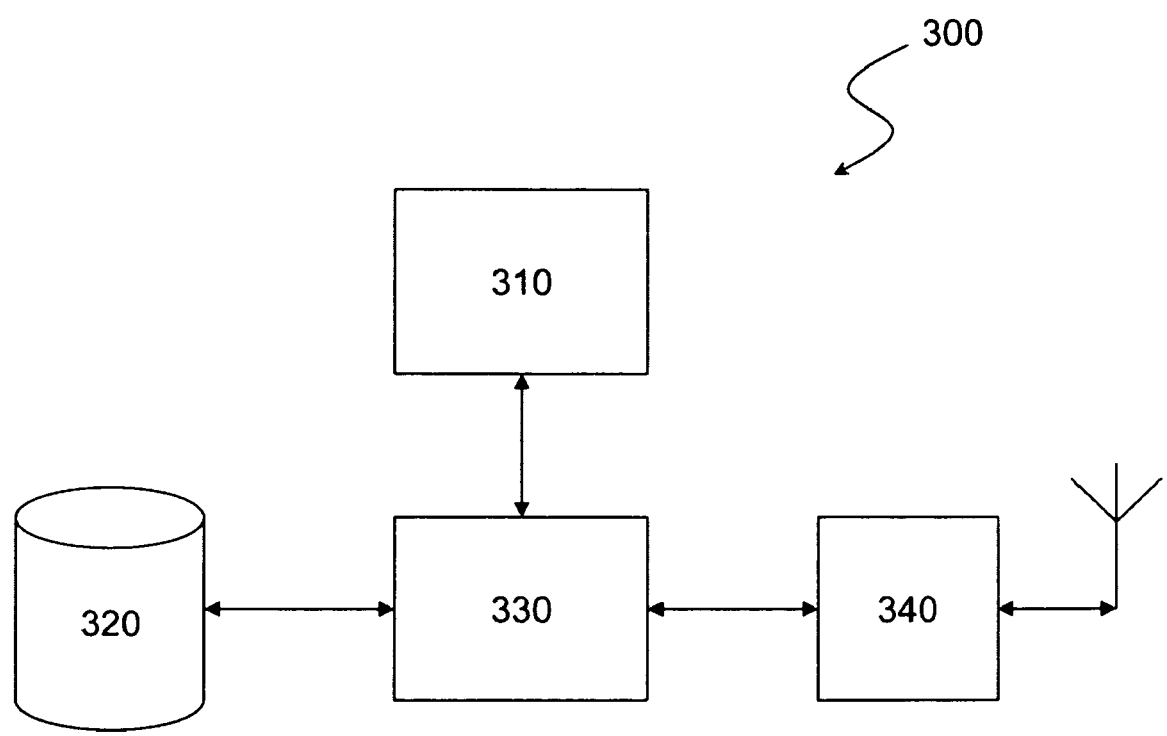
FIG. 3 diagrammatically shows a cognitive radio terminal according to one embodiment of the invention.

FIG. 3 diagrammatically shows a terminal in a cognitive radio system according to the invention.

The terminal 300 comprises positioning means 310 capable of determining its position at least approximately. Approximately means for example a precision of the order of the diameter of a cell in the primary telecommunication system.

The terminal also includes a database 320 in which the positions of the different transmitters in the primary system, the frequency bands allocated to them and coverage information are stored. The coverage information of a transmitter is used to determine its coverage area, the geometric description of the coverage area of the transmitter (and even coverage areas for the different bands). The terminal thus knows the spectral deployment map of the primary system precisely.

The calculation means 330 then search for the transmitters to which each band $B_k$ is allocated. The means 330 then recover coverage information corresponding to these transmitters, and starting from the position of the terminal, calculate the values $P_{max}^k$ before sorting bands by decreasing value of $P_{max}^k$ as indicated above.

The bands sorted into the order thus obtained are then transmitted to the cognitive transmission/reception module 340 to search for available bands. The availability of bands may be tested with a simple power detector.

The positioning means 310 may for example consist of a GPS receiver, or triangulation means starting from signals transmitted by base stations, in a manner known to those skilled in the art.

A specific positioning method can be used if the primary telecommunication system is the DVB-T system.

A first variant of said positioning method makes use of spectral signatures of the different transmitters as described below.

The following describes the case in which each DVB-T transmitter is characterised by a sub-set of l channels assigned to it among K channels. For example, in France the TNT (Télévision Numérique Terrestre—Terrestrial Digital Television) that respects the DVB-T standard, uses UHF channels 21 to 69, each transmitter only being able to transmit in l=6 channels among the K=49 UHF channels mentioned above. A combination of these l channels among L forms the spectral signature of the transmitter.

The positioning method detects the occupied UHF channels to identify the spectral signature of the closest transmitter. This is done by detecting UHF channels occupied by DVB-T signals. Since these signals use an OFDM (Orthogonal Frequency Division Multiplexing) modulation of well defined time parameters, a method of estimating characteristics of OFDM signals disclosed in the French patent application No. 07 55394 filed the same day by the applicant and included here by reference, will advantageously be used.

More precisely, an OFDM signal $s_a$ received by the terminal can be expressed in the following form, ignoring multi-paths and after demodulation into baseband:

$$s_a(t) = \frac{\sqrt{E}}{M} \sum_k g(t-k(M+D)T_c)e^{2i\pi\Delta ft} \cdot \sum_{m=0}^{M-1} a_{n+kM} e^{2i\pi \frac{m}{MT_c}(t-DT_c-k(M+D)T_c)} \quad (1)$$

where E is the signal power, M is the number of OFDM multiplex carriers, $a_n$ are information symbols belonging to a modulation alphabet, QPSK, $1/T_c$ is the flow of information symbols, and D is the size of the cyclic prefix expressed as a number of information symbols, g(t) is a formatting pulse of OFDM symbols with a time support and $\Delta f$ is a carrier residue due to the imperfection of the RF demodulation. In the case of TDT DVB-T signals, the time parameters are defined, and are equal to M=8192, D=256, $T_c=\frac{1}{8}$ μs.

The presence of an OFDM signal is detected from the calculation of the discrimination function $J(\alpha, \beta)$:

$$J(\alpha, \beta) = \sum_{p=-P}^{P} \left| \frac{1}{U} \sum_{u=0}^{U-1} s(u) s*(u-\alpha) e^{-2i\pi \frac{p}{\alpha+\beta}} \right|^2 \quad (2)$$

where s(u), u=0, ..., U−1 is a sequence of samples of the received signal obtained after demodulation in base band and sampling at the frequency of $$\frac{1}{T_e} = \frac{1}{T_c}.$$

$UT_e$ is the length of the sampled sequence, preferably chosen between 0.05 s and 0.1 s; P is an integer number such that P≧1, for example P=2. This discrimination function is used to detect the presence of an OFDM signal with time parameters α=M and β=D, the probability of the presence of such a signal being greater for high values of J(α,β).

Figure 4:
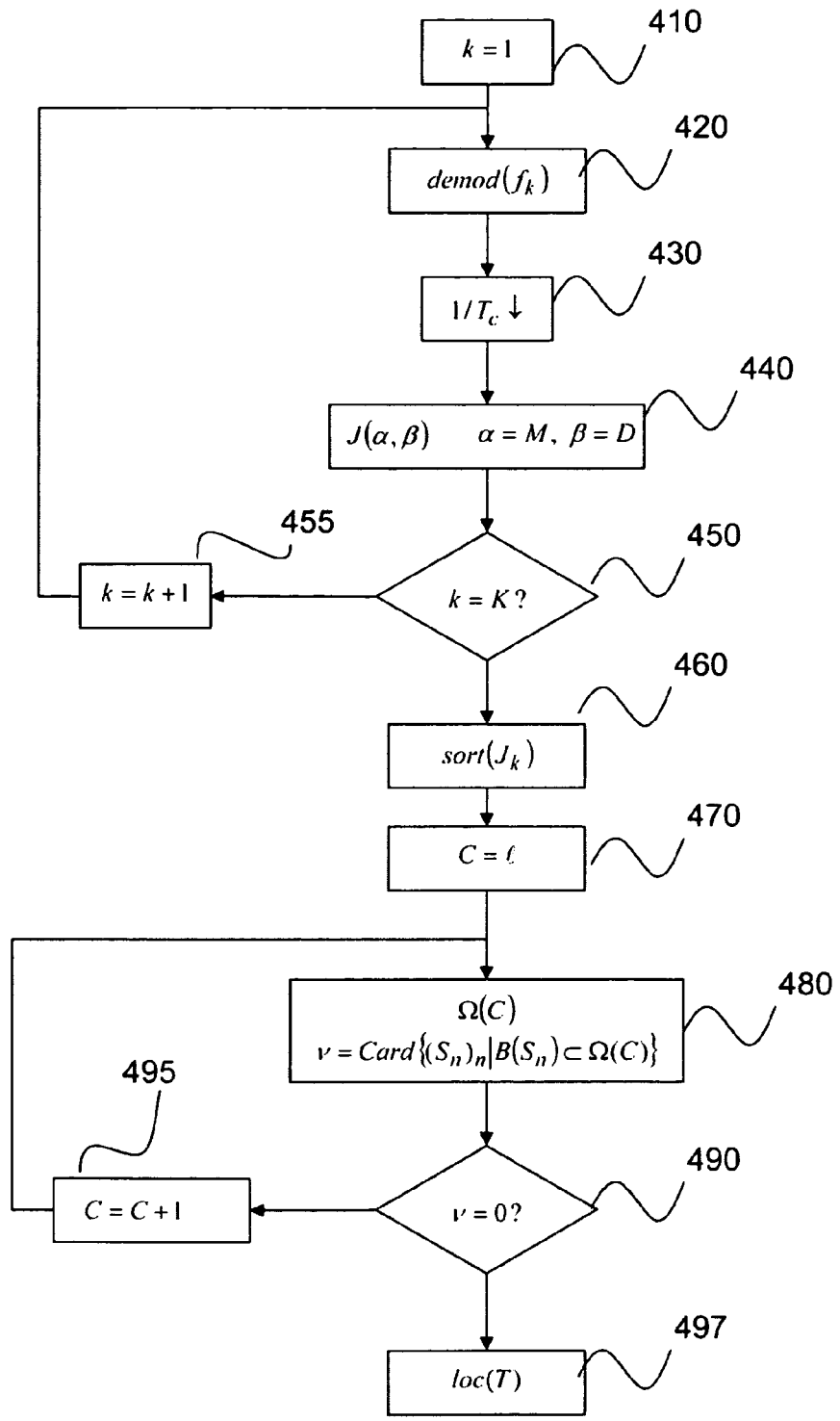
FIG. 4 gives the flowchart for a positioning method used in one advantageous embodiment of the invention.

FIG. 4 gives the flowchart of a positioning method by identification of a spectral signature.

The channel index k is initialised to 1 in 410 and the following sequence of steps is performed for each UHF channel $B_k$, k=1, ..., K, in this case with K=49:

In 420, the signal at the channel central frequency $f_k$ is demodulated to bring it into the base band and it is sampled in 430 at the symbol frequency $1/T_c$.

In step 440, the value of the discrimination function is calculated for the above-mentioned time parameters α=M and β=D.

In step 450, we determine if k=K. If not, then k is incremented in 455, and we return to step 420. If so, in other words when the K channels have been tested, we sort the values of J(α, β) obtained for the different channels, namely $J_k$, k= 1, ..., K, in 460.

In 470, a channel counter C is initialised to 1 and the number v of transmitters with a spectral signature included in the set of these C channels is set to 0. An iteration loop is then started.

In 480, the set Ω(C) of C channels $B_k$ corresponding to the C highest values $J_k$ is determined.

The next step in 480 is to search for transmitters for which their spectral signatures (in other words all their l allocated channels) are included in the set Ω(C). v is equal to the number of these transmitters.

In 490, we test if the value of v is zero. If so, then C is incremented in 495 and we return to step 470. If not, then we generally obtain v=1 and the transmitter for which the six channels belong to Ω(C) is selected in 497. We then consider that the terminal is located in the coverage area of Ω(C). If v>1, this means that the terminal is located between several transmitters, in other words at the intersection of several coverage areas.

With this positioning method, it is possible to determine the position of the terminal with a precision of the order of the average diameter of the coverage areas.

A second variant of said positioning method assumes that the database contains a map of UHF channels used on the region of interest. More precisely, this region is divided into elementary areas (for example blocks) and there is a record in the database for each elementary area. This record gives for each channel of B the average reception level of the signals transmitted by the primary system in this channel. Thus, for each area $Z_i$, there is an ordered list of corresponding average reception levels $\Lambda_i = \{\lambda_i(b) | b \in \Gamma_i\}$ where $\lambda_i(b)$ is the average reception level of band b in area $Z_i$. If no signal is transmitted by the primary system in band b for area $Z_i$, an arbitrary value below the minimal detection level of the primary signal will be chosen for $\lambda_i(b)$, for example, −15 dB below the noise level.

According to this second positioning variant, the positioning means of the cognitive terminal determine firstly the UHF channels in which this terminal can receive power greater than a given threshold, for example 10 dB above the noise level. The sub-set of B composed of these channels will be denoted $\Gamma = \{b_{k_1}, \ldots b_{k_p}\}$, and the ordered list of levels measured in the corresponding bands will be denoted $\Lambda = \{\mu(b_{k_1}), \ldots, \mu(b_{k_p})\}$.

The positioning means then search among the set of areas $Z_i$ listed in the database, for the area $Z_{i0}$ such that $\Lambda_i$ is closest to $\Lambda$, according to a certain metrics.

More precisely, we determine a scalar $\rho_i$ for each area $Z_i$ such that:

$$\varepsilon_i = \sum_{b \in \Gamma} (\mu(b) - \rho_i \lambda_i(b))^2 \quad (3)$$

is a minimum. Let this minimum be $d_i = \varepsilon_i^{min}$. The value $d_i$ actually represents a distance between $\Lambda_i$ and $\Lambda$. Those skilled in the art will understand that metrics others than those defined in (3) could be envisaged.

We can then determine the area $Z_{i0}$ as being the area among areas $Z_i$ that represents the shortest distance $d_i$. The cognitive terminal can then be assumed to be positioned in area $Z_{i0}$.

Alternatively, we could accept a margin of error and select the areas $Z_i$ such that the distance $d_i$ is less than a predetermined tolerance threshold $d_{min}$. In this case, the cognitive terminal will be assumed to be located in the area:

$$Z = \bigcup_{d_i < d_T} Z_i \quad (4)$$

According to a third variant, the first and the second variants of the positioning method are combined. More precisely, we determine the intersection:

$$Z \cap \pi(\Omega(C)) \quad (5)$$

where Z is defined by expression (4) and π(Ω(C)) is the coverage area of the transmitter for which channels are given by Ω(C), as defined above.

If a positioning incompatibility between the first and second variants is obtained during application of this third variant, in other words if Z∩π(Ω(C))=Ø, then priority can be given to one of these two variants. Advantageously, in such a divergence case, we will choose the second positioning variant by limiting the sub-set $\Gamma = \{b_{k_1}, \ldots b_{k_p}\}$ to a predetermined number χ of channels (for example χ=5) corresponding to the χ highest measured reception levels of Λ.

The invention claimed is:

1. Cognitive telecommunication terminal designed to coexist with a primary telecommunication system using a set of transmission frequency bands (B) comprising a plurality of spatially distributed transmitters, each transmitter being suitable for transmitting within a coverage area in a plurality of frequency bands in said set allocated to the transmitter, said terminal being characterised in that it comprises:
   positioning means suitable for providing the position of said terminal with a predetermined precision;
   a database in which the position, allocated frequency bands and coverage information defining the coverage area are stored for each transmitter;
   calculation means suitable for determining the maximum power that the terminal can transmit for each frequency band in said set, starting from said terminal position, together with the position, allocated frequency bands and the coverage area for each transmitter, said calculation means also being suitable for sorting frequency bands as a function of the maximum powers thus obtained;
   radio transmission/reception means suitable for detecting the presence of a signal in the frequency bands thus sorted, beginning with the frequency band associated with the highest maximum power.

2. Cognitive telecommunication terminal according to claim 1, characterised in that the calculation means are suitable for taking each frequency band in said set, and determining transmitters with said band among their allocated frequency bands, and then, as a function of the database coverage information, determining the coverage areas of each of these transmitters, and deducing the transmitter ($S_{n_0}^{\ k}$) for which the coverage area ($Z_{n_0}^{\ k}$) is closest to said terminal for the band considered.

3. Cognitive telecommunication terminal according to claim 2, characterised in that the calculation means are suitable for using a propagation model and calculating the maximum power ($P_{max}^{\ k}$) that the terminal can transmit without the field intensity generated at the point on the coverage area closest to the terminal exceeding a predetermined threshold value ($E_{max}^{\ k}$).

4. Telecommunication terminal according to claim 1, characterised in that a power detector can detect the presence of a signal in said sorted bands.

5. Cognitive telecommunication terminal according to claim 1, characterised in that the positioning means are a GPS receiver.

6. Cognitive telecommunication terminal according to claim 1, characterised in that said positioning means determine the position of the terminal with a precision equal to the average diameter of a coverage area, as a function of the spectral signature of the closest transmitter to the terminal.

7. Cognitive telecommunication terminal according to claim 6, characterised in that the primary telecommunication system transmits OFDM signals of predetermined time parameters in frequency bands of said set, and the positioning means are suitable for determining the probability of the presence of an OFDM signal in each of said bands and sorting the bands in order of decreasing probability to obtain an ordered list of bands.

8. Cognitive telecommunication terminal according to claim 7, characterised in that the time parameters may be the useful duration and the cyclic prefix length of an OFDM symbol and in that the probability of an OFDM signal being present is estimated by the discrimination function:

$$J(\alpha, \beta) = \sum_{p=-P}^{P} \left| \frac{1}{U} \sum_{u=0}^{U-1} s(u) s*(u-\alpha) e^{-2i\pi \frac{p}{\alpha+\beta}} \right|^2$$

where s(u),u=0, . . . ,U−1 is a sequence of samples of the signal received by the terminal, obtained after demodulation in the base band and sampling, α and β are the useful duration and the prefix length of an OFDM symbol respectively, expressed as a number of samples.

9. Cognitive telecommunication terminal according to claim 8, characterised in that the primary telecommunication system is a DVB-T broadcasting system, and in that six frequency bands are allocated per transmitter and P=3.

10. Cognitive telecommunication terminal according to claim 7, characterised in that the terminal position is given by the transmitter for which all allocated bands are the first to appear in said ordered list.

11. Cognitive telecommunication terminal according to claim 1, characterised in that for each elementary area ($Z_i$) in a plurality of elementary areas for a given region, the database contains a list ($\Lambda_i$) of corresponding average reception levels in these bands, the positioning means being also suitable for measuring the reception levels in the various bands (B), selecting bands in which the reception level is greater than a given threshold, and searching for the area ($Z_i$) for which the list ($\Lambda_i$) of average reception levels is closest in distance to the list ($\Lambda$) formed of levels measured in the bands thus selected.

12. Cognitive telecommunication terminal according to claim 1, characterised in that for each elementary area ($Z_i$) in a plurality of elementary areas for a given region, the database contains a list ($\Lambda_i$) of corresponding average reception levels in these bands, the positioning means being also suitable for measuring the reception levels in the various bands (B), for selecting bands in which the reception level is greater than a given threshold, and searching for areas ($Z_i$) for which the list ($\Lambda_i$) of average reception levels is similar to the list ($\Lambda$) formed of levels measured in the bands thus selected, at a given distance less than a predetermined threshold ($d_T$).

13. Cognitive telecommunication terminal according to claim 12, characterised in that the positioning means position the terminal in the area $$\left( Z = \bigcup_{d_i < d_T} Z_i \right)$$

formed of the combination of elementary areas representing a distance less than said predetermined threshold.

14. Method of searching for available band for a terminal required to coexist with a primary telecommunication system using a set (B) of transmission frequencies comprising a plurality of spatially distributed transmitters, each transmitter being suitable for transmitting within a coverage area in a plurality of frequency bands in said set and allocated to the transmitter, said method being characterised in that:
   the position of said terminal is obtained with a predetermined precision;
   the maximum power that the terminal can transmit for each frequency band in said set is determined, starting from said terminal position, together with the position, allocated frequency bands and coverage area for each transmitter;
   frequency bands are sorted as a function of the maximum powers thus obtained;
   the presence of a signal is detected in the frequency bands thus sorted, beginning with the frequency band associated with the highest maximum power.

15. Method of searching for available band according to claim 14, characterised in that, for each frequency band in said set, it is possible to determine transmitters with said band among their allocated frequency bands, and then to determine the coverage areas of each of these transmitters, and to deduce the transmitter ($S_{n_0}^{\ k}$) for which the coverage area ($Z_{n_0}^{\ k}$) is closest to said terminal for the band considered.

16. Method of searching for available band according to claim 15, characterised in that it is possible to use a propagation model and calculate the maximum power ($P_{max}^{\ k}$) that the terminal can transmit without the field intensity generated at the point on the coverage area closest to the terminal exceeding a predetermined threshold value ($E_{max}^{\ k}$).

17. Method of searching for available band according to claim 14, characterised in that power detection detects the presence of a signal in said sorted bands.

18. Method of searching for available band according to claim 14, characterised in that the position of the terminal is obtained by a GPS receiver.

19. Method of searching for available band according to claim 14, characterised in that the position of the terminal is obtained with a precision equal to the average diameter of a coverage area, as a function of the spectral signature of the closest transmitter to the terminal.

* * * * *